United States Patent [19]
Pacanowski et al.
[11] Patent Number: 4,489,592
[45] Date of Patent: Dec. 25, 1984

[54] DENSITY MONITOR AND METHOD

[75] Inventors: Ronald F. Pacanowski, Hoffman Estates; Robert W. Sampson, Arlington Heights; Paul J. Kuchar, Hinsdale, all of Ill.

[73] Assignee: UOP Inc., Des Plaines, Ill.

[21] Appl. No.: 468,787

[22] Filed: Feb. 22, 1983

[51] Int. Cl.[3] .................... G01N 9/32
[52] U.S. Cl. .................... 73/30; 73/1 G
[58] Field of Search ............ 73/30, 23, 1 G, 861.02, 73/861.03

[56] References Cited

U.S. PATENT DOCUMENTS

| | | | |
|---|---|---|---|
| 1,911,853 | 5/1933 | Silcox | 73/30 |
| 2,703,494 | 3/1955 | Carney | 73/861.02 |
| 3,082,618 | 3/1963 | Nerheim | 73/30 |
| 3,273,377 | 9/1966 | Testerman et al. | 73/23.1 |
| 3,554,004 | 1/1971 | Rauch et al. | 73/23 |
| 3,701,280 | 10/1972 | Stroman | 73/30 |
| 3,756,068 | 9/1973 | Villarroel et al. | 73/23 |
| 4,150,561 | 4/1979 | Zupanick | 73/23 |

OTHER PUBLICATIONS

Instruments and Control Systems, Jan. '71, pp. 81–82, "Molecular Weight Sensor" by M. J. LeRoy Jr. and S. H. Gorland.

NASA TM X-52780, "Evaluation of a Fluidic Oscillator as a Molecular-Weight Sensor of Gases" by M. J. LeRoy Jr. and S. H. Gorland.

NASA TM X-1939, "Sensing Molecular Weights of Gases with a Fluidic Oscillator" by M. J. LeRoy Jr. and S. H. Gorland.

Fossil Energy I & C Briefs, Nov. '81, vol. 2, No. 6, "Fluidic Oscillator Sensors" by Trevor Sutton.

Ind. Eng. Chem. Fundam., vol. 11, No. 3, 1972, pp. 407–409, "A Fluidic-Electronic Hybrid System for Measuring the Composition of Binary Mixtures" by C. Anderson et al.

NASA TM X-1269, "Use of a Fluidic Oscillator as a Humidity Sensor for a Hydrogen-Steam Mixture" by P. R. Prokopius.

NASA TM X-3068, "Use of Fluidic Oscillator to Measure Fuel-Air Ratios of Combustion Gases" by S. M. Riddlebaugh.

NASA Report No. L0341, 04-16-76, "Fluidic Hydrogen Detector Production Prototype Developement" by G. W. Roe and R. E. Wright (Sections 4 & 5 and Appendices have been omitted).

*Primary Examiner*—Stephen A. Kreitman
*Attorney, Agent, or Firm*—James R. Hoatson, Jr.; Richard J. Cordovano; William H. Page, II

[57] ABSTRACT

Methods and apparatus for determining density of gases and vapors. The primary sensing device is a fluidic oscillator through which a sample of gas is passed.

8 Claims, 3 Drawing Figures

DENSITY MONITOR AND METHOD

BACKGROUND OF THE INVENTION

This invention relates to determination of density of substances in gaseous form.

It is important to know the density of a gas in many industries, in particular, in the area of petroleum and petrochemical processing. A typical application is a mass flow meter, where volumetric flow rate is combined with the density of the flowing stream to produce mass flow rate. One seeking to measure density, particularly on a continuous on-line basis, has a limited choice of apparatus. One commercially available density meter utilizes an oscillating element in the fluid whose density is measured. Oscillation is caused by an electromagnetic field. The frequency of oscillation depends on the density of the fluid. The sensing element is contained in a housing having one-inch flanges for installation in a pipeline. A standard reference, *Process Instruments and Controls Handbook*, 2nd ed., 1974, edited by Considine, lists only three techniques for measuring density, none of which are well suited for use outside the laboratory. The listed methods (p. 6-152) are as follows.

In a gas specific gravity balance, a tall column of gas is measured by a floating bottom fitted to the gas containment vessel. A mechanical linkage displays movement of the bottom on a scale. A buoyancy gas balance consists of a vessel containing a displacer mounted on a balance beam and with a manometer connected to it. Displacer balance is established with the vessel filled with air and then filled with gas, the pressure required to do so being noted from the manometer in both cases. The pressure ratio is the density of the gas relative to air. In a viscous drag density instrument, an air stream and a stream of the gas under test are passed through separate identical chambers, each containing a rotating impeller. The two streams are acted upon by the rotating impellers and in turn each acts upon a non-rotating impeller mounted in the opposite end of the chamber. The non-rotating impellers are coupled together by a linkage and measure the relative drag shown by the tendency of the impellers to rotate, which is a function of relative density.

STATEMENT OF ART

LeRoy and Gorland have explored the use of a fluidic oscillator as a molecular weight sensor of gases and reported their work in an article entitled "Molecular Weight Sensor" published in *Instruments and Control Systems* of Jan. 1971, and in National Aeronautics and Space Administration Technical Memorandum TMX-52780 (circa 1970) and TMX-1939 (Jan. 1970). In *Fossil Energy I & C Briefs*, Nov. 1981, prepared for the U.S. Dept. of Energy by Jet Propulsion Laboratory of California Institute of Technology, Sutton of The Garrett Corp., referred to the use of a fluidic oscillator to measure mass flow. The use of a fluidic oscillator in measuring composition in a methanol-water system is discussed in an article on page 407 of *Ind. Eng. Chem. Fundam.*, Vol. 11, No. 3, 1972. U.S. Pat. No. 3,273,377 (Testerman) shows the use of two fluidic oscillators in analyzing fluid streams. A fluidic device for measuring the ratio by volume of two known gases is disclosed in U.S. Pat. No. 3,554,004 (Rauch et al.). In U.S. Pat. No. 4,150,561, Zupanick claims a method of determining the constituent gas proportions of a gas mixture which utilizes a fluidic oscillator.

In National Aeronautics and Space Administration Technical Memorandum TMX-1269 (Aug. 1966), Prokopius reports on the use of a fluidic oscillator in a humidity sensor developed for studying a hydrogen-oxygen fuel cell system. In NASA TMX-3068 (June 1974), Riddlebaugh describes investigations into the use of a fluidic oscillator in measuring fuel-air ratios in hydrocarbon combustion processes. NASA Report No. L0341 (Apr. 16, 1976), written by Roe and Wright of McDonnell Douglas under Contract No. NAS 10-8764 at the Kennedy Space Center, reports on work done to develop a fluidic oscillator as a detector for hydrogen leaks from liquid hydrogen transfer systems. U.S. Pat. No. 3,756,068 (Villarroel et al.) deals with a device using two fluidic oscillators to determine the percent concentration of a particular gas relative to a carrier gas.

BRIEF SUMMARY OF THE INVENTION

It is an object of this invention to provide methods and apparatus for determining densities of gases and vapors which are capable of use both in the laboratory and in the field. Also, it is an object that such apparatus be relatively inexpensive, have a minimum of moving mechanical parts, and be compact, so as to facilitate transportation and installation. It is a further object of this invention that such methods and apparatus have high reliability and accuracy while providing results essentially instantaneously. In one of its broad embodiments, the invention comprises (a) a fluidic oscillator; (b) means for establishing flow of a sample through said oscillator; (c) means for measuring and controlling the pressure at which the sample passes through said oscillator and transmitting a signal representative of the pressure; (d) means for measuring the temperature of the sample at said oscillator and transmitting a signal representative of the temperature; (e) means for measuring the frequency of oscillation at said oscillator and transmitting a signal representative of the frequency; (f) computing means for calculating the density of the sample using equations and data stored in said computing means and data supplied by said means for providing pressure, temperature, and frequency signals; and, (g) means for communicating information contained in said computing means.

DETAILED DESCRIPTION OF THE INVENTION

A device known as a fluidic oscillator is used in this invention. This is one of a class of devices which are utilized in the field of fluidics. A fluidic oscillator may have any of a number of different configurations in addition to that depicted in FIG. 1. The publications mentioned under the heading "Statement of Art" describe fluidic oscillators and their governing principles in detail and therefore it is unnecessary to present herein more than the following simple description.

Figure 1:
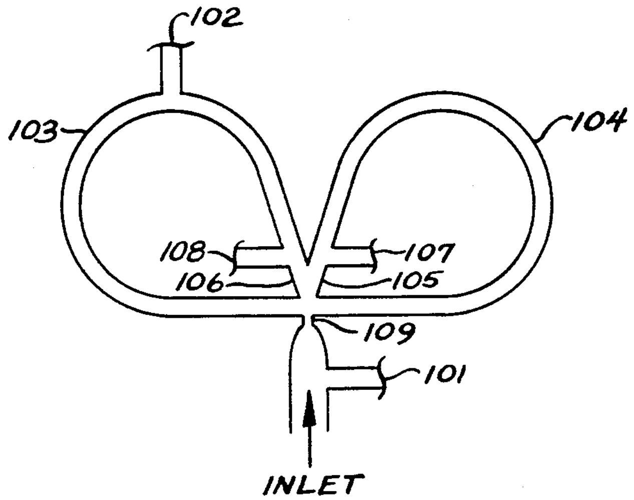
FIG. 1 is a schematic diagram of a fluidic oscillator.

A fluidic oscillator may be described as a set of passageways, in a solid block of material, which are configured in a particular manner. If the passageways are centered in the block and the block is cut in half in the appropriate place, a view of the cut surface would appear as the schematic diagram of FIG. 1. Referring to FIG. 1, a gas stream enters the inlet, flows through nozzle 109, and "attaches" itself to one of two stream attachment walls 105 and 106 in accordance with the principle known as the Coanda effect. Gas flows through either exit passage 107 or exit passage 108, depending on whether the stream is attached to wall 105 or wall 106. Exit passages 107 and 108 can be considered as extending to the outside of the block of material in a direction perpendicular to the plane in which the other passages lie. Consider a gas stream which attaches to wall 105 and flows through exit passage 107. A pressure pulse is produced that passes through delay line 104. The pressure pulse impinges on the gas stream at the outlet of nozzle 109, forcing it to "attach" to wall 106 and flow through exit passage 108. A pulse passing through delay line 103 then causes the stream to switch back to wall 105. It is in this manner that an oscillation is established. The frequency of the oscillation is a function of the pressure propagation time through the delay line and time lag involved in the stream switching from one attachment wall to the other. For a delay line of given length, the pressure propagation time is a function of the characteristics of the gas, as shown in the above mentioned publications and also by the equations which are presented herein. The frequency of oscillation can be sensed by a pressure sensor or microphone located in one of the passages, such as shown by sensing port 102. A differential sensing device connected to both passages can also be used. Sensing port 101 is shown to indicate one potential location for a temperature sensor.

Figure 2:
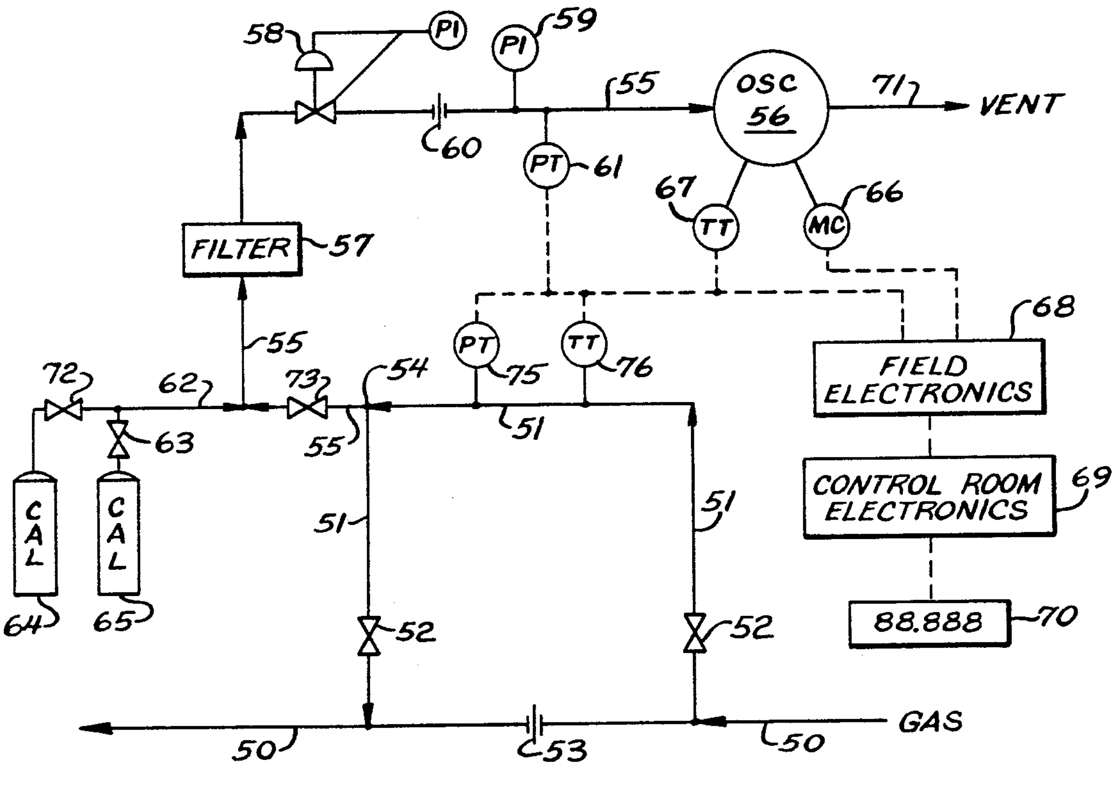
FIG. 2 is a schematic diagram of an embodiment of the invention comprising a density monitor wherein the density of gas flowing in a pipeline is measured on a continuous basis and displayed in a remote location.
Figure 3:
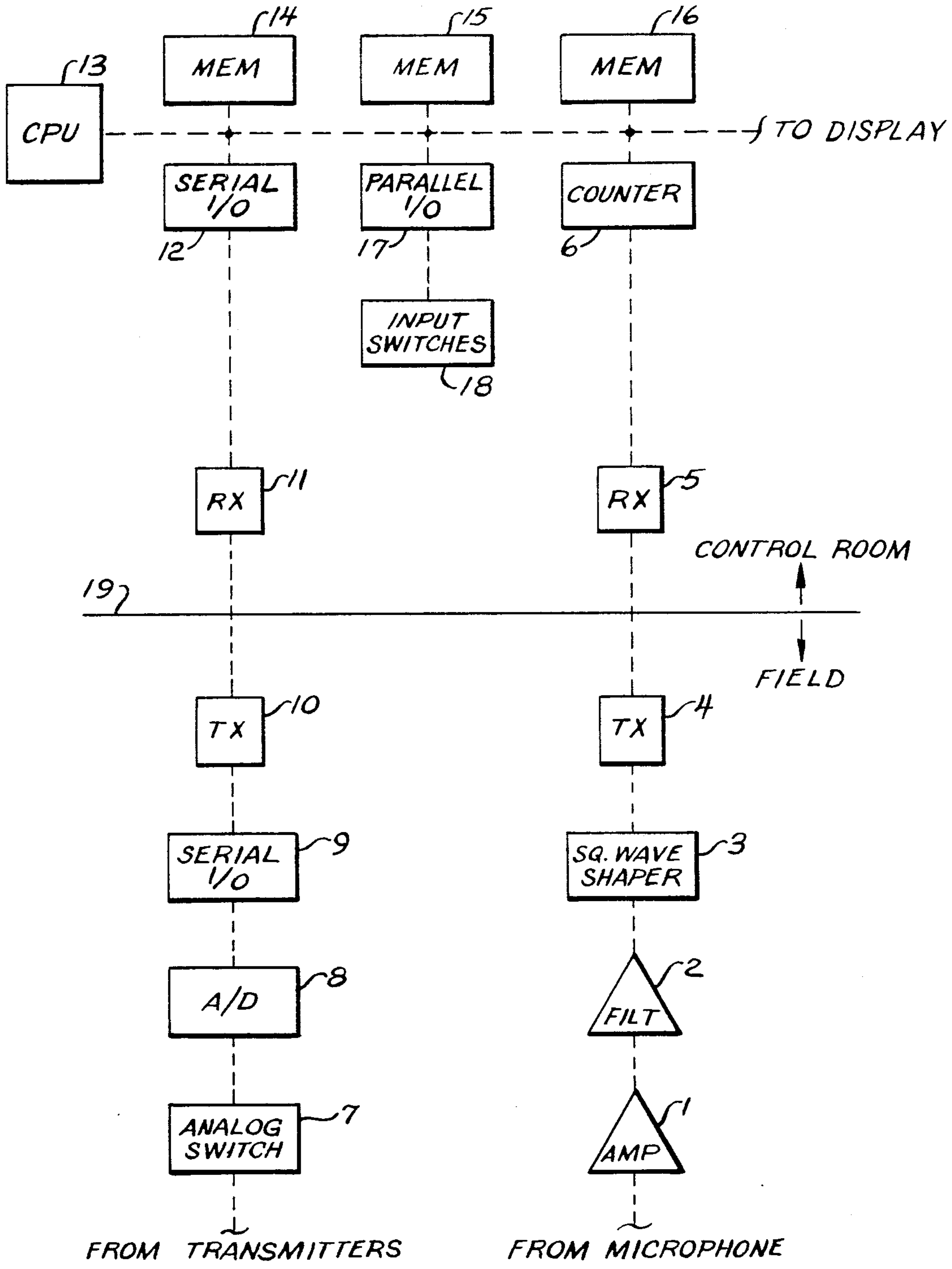
FIG. 3 is an expansion, in block diagram form, of the portions of FIG. 2 labelled electronics.

The invention can be most easily described by initial reference to FIGS. 2 and 3, which represent a particular embodiment of the invention. Reference will also be made to a particular prototype monitor which was fabricated and tested. Referring to FIG. 2, gas is flowing through pipeline 50. A sample flow loop 51 is formed by means of conduit, such as ¾-inch diameter pipe, connected to pipeline 50 upstream and downstream of pressure drop element 53. The purpose of pressure drop element 53 is to cause a loss of pressure in pipeline 50 which is the same as the pressure drop in flow loop 51 when a sufficient amount of gas is passing through flow loop 51. Gas flow through flow loop 51 is sufficient when gas composition at sample point 54 is substantially the same as that in pipeline 50 at any given instant. Normally pressure drop element 53 is a device present in the pipeline for a primary purpose unrelated to taking a sample, for example, a control valve. A sufficient length of pipeline 50 can serve as pressure drop element 53 or an orifice plate can be installed in pipeline 50 to serve the purpose. Valves 52 are used to isolate flow loop 51 from pipeline 50.

Pressure and temperature of the gas flowing in pipeline 50 are provided by pressure transmitter 75 and temperature transmitter 76. These are located close to pipeline 50, so that differences in pressure and temperature between their locations and pipeline 50 are not significant. Pipeline 50 is covered with thermal insulation of a type commonly used on pipelines. The location shown in FIG. 2 has the advantage of allowing the density monitor to be a self-contained package. However, if the pressure and temperature differences are significant, transmitters 75 and 76 can be located directly on pipeline 50. The measured pressure and temperature are referred to herein as $T_1$ and $P_1$.

Sample line 55 carries a sample of gas from sample point 54 to fluidic oscillator 56. Filter 57 is provided to remove particles which might be present in the sample, so that the narrow passages of fluidic oscillator 56 or other flow paths will not become plugged. Pressure regulator 58, of the self-contained type with an integral gauge, is provided so that the gas flowing through oscillator 56 is at a substantially constant pressure. The frequency of oscillation at oscillator 56 may vary with pressure, depending on the particular oscillator used and the actual pressure at the oscillator. As will be seen, frequency is correlated with density, so variation for any other reason is unacceptable. Any pressure regulating means capable of maintaining flow through oscillator 56 at a substantially constant value may be used. Under certain circumstances, sufficient pressure regulation will exist by virtue of system configuration and pressure level, so that no separate pressure regulation device is needed.

Orifice 60 is provided for the purpose, in conjunction with pressure regulator 58, of maintaining a constant flow of gas through oscillator 56. Pressure gauge 59 indicates the pressure downstream of orifice 60. Normally it is not necessary to install orifice 60, as sample line 55 or the inlet port of oscillator 56 serves the same purpose. Conduit 71 carries the sample away from oscillator 56, to the atmosphere in a location where discharge of the gas will cause no harm or to a process vessel where it can be utilized. However, the quantity of gas is sufficiently small that it may not be economical to do more than discharge it to the atmosphere. Pressure transmitter 61 provides the pressure of the gas at the oscillator. Also, a switch device (not shown) which provides a signal for actuation of an alarm if the pressure does not remain in a previously established range may be provided. This switch device would initiate communication that inaccurate results may be obtained.

Obtaining a representative sample stream from a pipeline, providing it to the inlet port of a fluidic oscillator, removing it from the outlet port of the oscillator, and maintaining a substantially constant pressure drop across the oscillator can be accomplished by a variety of different means and methods for each given set of conditions, such as desired flow rate through the oscillator and pipeline pressure. These means and methods, which can be applied as alternatives to those shown in FIG. 2, are well known to those skilled in the art.

A fluidic oscillator can be designed and fabricated upon reference to the literature, such as that mentioned under the heading "Statement of Art" or may be purchased. In the prototype monitor, an oscillator supplied by Garrett Pneumatic Systems Division of Phoenix, Ariz. was used. This oscillator is of a different configuration than that shown in FIG. 1 in that the "loops" formed by delay lines 103 and 104 are open such that the "loops" define cavities and in that there is only one exit passage. Drawings of this configuration can be found in the cited references. The flow rate through this oscillator when testing natural gas is approximately 250 $cm^3$/min when upstream pressure is approximately 20 psig and the oscillator is vented directly to atmosphere. A flow rate range of 200 to 500 $cm^3$/min is considered to be reasonable for commercial use and sufficient to provide acceptable density results.

Temperature transmitter 67 provides the temperature of the gas at the oscillator. Any of the well known means of sensing temperature may be used for this and temperature transmitter 76, such as a thermister or thermocouple. A solid state semiconductor sensor was used in the prototype device. The sensor may be located in a passage of the oscillator, such as shown in FIG. 1 (sensing port 101), or in the sample line or conduit adjacent to the oscillator. Microphone 66 senses the frequency of oscillation at oscillator 56. It is located in a position to sense when the gas stream attaches itself to one of the walls, such as the position shown in FIG. 1 (sensing port 102). There are a wide variety of sensors which can be used, for example, a piezoceramic transducer, in which pressure induces a voltage change, or a piezo-resistance transducer, in which pressure induces a resistance change. Used in the prototype was a Series EA 1934 microphone supplied by Knowles Electronics of Franklin Park, Ill.

Signals from microphone 66 and transmitters 61, 67, 75, and 76 are processed by equipment denoted field electronics 68 and control room electronics 69. Field electronics are located adjacent to oscillator 56 while control room electronics are in a central control room some distance away from oscillator 56. This equipment processes the signals to obtain densities of the gas samples and performs other functions which will be described herein. Display unit 70 receives signals from control room electronics 69 and communicates densities of the gas and other information in human-readable form. It may be, for example, a liquid crystal display. The information may be communicated to other equipment, such as a strip chart recorder (not shown) for making a permanent record or a computer (not shown) for further manipulation.

Periodic calibration must be accomplished to check for malfunctions and changes which might take place in the apparatus such as electronic drift, corrosion, and substances accumulating in the apparatus. Two containers of calibration gas, 64 and 65, are provided to check that the monitor is operating properly. Normally one of the calibration gases has a density in the lower part of the range of values expected of the gas flowing in pipeline 50 and one has a density in the higher part of that range. The monitor is placed in the appropriate calibration mode by means of one of input switches 18. By manipulating valves 63, 72 and 73, the calibration gases are allowed to flow, in turn, through calibration conduit 62 and sample line 55 to oscillator 56. Since the pressure and temperature of the calibration gases will vary as conditions such as ambient temperature change, the calibration gas densities calculated by the monitor must be adjusted to a pressure and temperature at which the calibration gas densities are known. For example, if pressure transmitter 61 measures a pressure of 20 psig and temperature transmitter 67 measures a temperature of 30° F. when calibration gas from container 64 is flowing and the density of container 64 gas is known to be 0.0448 $lb/ft^3$ at O° C. and 1 atmosphere, the density communicated by the monitor must be at O° C. and 1.0 atmosphere. If the communicated density is significantly different from 0.0448, the monitor is not operating properly. Adjustment of a density value from one pressure and temperature to another is easily accomplished by means of the equation of state presented herein. The monitor may be arranged so that densities of the calibration gases are displayed and a human technician must, if necessary, adjust the monitor to the known calibration gas densities, or may be arranged so that the monitor is capable of adjusting itself. For example, as was done in the prototype device, the monitor could re-calculate the values of constants stored in it which are used in calculating sample densities.

The procedure just described does not accomplish calibration of pressure transmitter 75 and temperature transmitter 76. These items can be calibrated separately by standard means. If desired, the calibration gases can be introduced into flow loop 51 upstream of these items in order to include them in the calibration. It is also possible to compare a value determined by the monitor to the density of a calibration gas by manual means. Pressure, temperature, and density could be communicated by the monitor and an operator could refer to a standard chart or tables to compare the communicated results to the actual density of the calibration gas. Another method is to provide apparatus in line 55 to adjust pressure and temperature of calibration gas entering the oscillator to particular preestablished values. However, this method would be used only in rare circumstances, since it is less costly to manipulate numbers than to manipulate the physical condition of the calibration gases.

Partial calibrations, or operation checks, can be accomplished in a number of different ways. Use of a calibration gas can be combined with operation checks accomplished electronically. A totally electronic operational check can be made. For example, means for generating appropriate oscillating tones can be provided at microphone 66 so that new values of $K_1$ and $K_2$ can be calculated. Of course, this procedure checks only the electronics and not the oscillator. In another simple check, a tuning fork is used to generate a tone at microphone 66 and the synthetic "density" resulting from the tone input is compared to the expected proper value in computing means. Temperature changes can be used to perform operational checks. This can be done by using heating means, such as electrical resistance coils, to heat gas flowing into the oscillator and comparing densities of heated and unheated gas. If the gas used in the check is from a changing process source, provision must be made to prevent change during the checking period. This can be accomplished by providing a container to collect a sufficient quantity of gas to do the check or recycling gas from the oscillator outlet back through the system. Given a particular objective to be accomplished, other checks will become apparent.

An assembly of electronics devices for processing signals from the transmitters and microphone (variables) and providing signals to the display unit can be fabricated from standard components by one skilled in the art. FIG. 3 shows one such design in simplified form. Line 19 indicates which items are located in the field adjacent to oscillator 56 and which are located in the central control room. A signal from microphone 66 is provided to amplifier 1, passed through filter 2, and converted to a square wave pulse in square wave shaper 3. The output of square wave shaper 3 is provided to counter 6 by means of transmitter 4 and receiver 5. Counter 6 counts the number of cycles occurring in oscillator 56 in a unit of time, thus generating frequency information. The signals from pressure transmitters 61 and 75 and temperature transmitters 67 and 76 are selected one at a time by analog switching device 7 and sent sequentially to analog-to-digital converter 8, where they are converted to digital form. Serial input/output device 9 converts the output of analog-to-digital converter 8 to a serial pulse train, which is provided by means of transmitter 10 and receiver 11 to serial input/output device 12, located in the control room.

Memory device 15, a random access memory chip (RAM), is used to store the variables. A program for control of the electronics devices and performing computations is stored in memory device 14, a programmable read-only memory chip (PROM). Constants needed for the computation are stored in memory device 16, an electronically erasable programmable read-only memory chip (EEPROM). Central processing unit 13 performs the necessary computations and provides output signals to display unit 70. Input switches 18 are used to provide human input to the electronic components. These are rotary click-stop switches which can be set to any digit from 0 to 9. One of the switches is the mode switch and the others are used to enter numerical values. The position of the mode switch "instructs" the apparatus what to do. In the calculate mode, the apparatus displays the heat content of a sample. When the mode switch is placed in the "constant load" position, numerical values of constants can be manually set on the other switches and loaded into the system by depressing a button. Another position of the mode switch allows values of variables to be displayed in sequence on display 70. When it is desired to calibrate the apparatus, still other positions are used. Additional positions are used as required. Parallel input/output device 17 provides a means of transmitting information from input switches 18 and also controlling counter 6. It will be clear to one skilled in the art that certain of the electronics devices may be collectively referred to as a computer or computing means or may be contained within a computer or computing means.

The basic equation used in the practice of this invention which describes the operation of a fluidic oscillator is $$M = \frac{K_1 GT}{F^2} + K_2,$$

$M$=molecular weight of the gas flowing through oscillator,
$G$=specific heat ratio of the gas flowing through oscillator,
$T$=temperature of the gas flowing through oscillator,
$F$=frequency of oscillator output signal, and $K_1$ and $K_2$=constants.

The quantity G can be provided as a constant stored in computer memory or can be calculated by means of a correlation, such as the equation $$G = K_3 + K_4 M + K_5 M^2 + K_6 M^3,$$

where $K_3$, $K_4$, $K_5$ and $K_6$ are constants.

The density of the gas can be calculated by use of the equation $$D = \frac{m}{V} = \frac{MP_1}{ZRT_1},$$

$D$=density,
$m$=mass,
$V$=volume,
$P_1$=pressure at the point of density measurement,
$T_1$=temperature at the point of density measurement,
$Z$=compressibility factor, and
$R$=universal gas constant.

This equation is derived from the familiar equation of state $$PV = ZnRT = Z\frac{m}{M}RT,$$

where n=number of moles. Z can be easily expressed by means of equations which depend on M and data available in the literature, as explained herein.

The computer is programmed to solve these equations to obtain D, using values of F, T, $T_1$, and $P_1$ provided as described above, and values of constants which exist in computer memory.

An approach to developing a basic oscillator equation on a theoretical basis is as follows. Reference is made to FIG. 1 as an example. A pressure pulse which passes through delay line 103 or 104, described above, travels at the local speed of sound, u. Denoting the length of each delay line as L, the time required for the pulse to traverse a delay line is L/u. The time for a complete cycle of oscillation includes that required for a pulse to travel through each delay line. An equation for the local speed of sound is $$u = \left(\frac{GgRT}{M}\right)^{\frac{1}{2}},$$

where
u=speed of sound,
g=gravitational constant.

Thus the time required for the pulse to traverse the two delay lines is 2 L/u or $$2\,L \Big/ \left(\frac{GgRT}{M}\right)^{\frac{1}{2}}.$$

As explained above, the total time for a cycle of oscillation also depends on switching time, the time required for switching of the stream from one attachment wall to another, or the period between arrival of a pulse propagated through a delay line at nozzle 109 and the start of a pulse through the other delay line. Switching time can be expressed as inversely proportional to u, that is as $$\text{constant} \Big/ \left(\frac{GgRT}{M}\right)^{\frac{1}{2}}.$$

Since L is a constant for any given oscillator and the inverse of time is frequency, the following equation can be written $$F = \left(\frac{GgRT}{M}\right)^{\frac{1}{2}} \Big/ \text{constant} + \left(\frac{GgRT}{M}\right)^{\frac{1}{2}} \Big/ 2\,L.$$

Solving the equation for M and making g, L, and R a part of the constant, the equation becomes $$M = \frac{\text{constant} \times GT}{F^2}.$$

If the above constant is designated as $K_1$, and $K_2$ is added to the right-hand side, the basic equation presented herein is obtained. It has been found necessary to add the constant $K_2$ to the equation in order to accurately describe the oscillator. It is not possible to use a purely theoretical equation, in part as a result of the imperfections of hardware and measuring equipment. For example, no two fluidic oscillators will perform in an identical manner. In the prototype density monitor, which was developed for use in a natural gas application, $K_1$ and $K_2$ were empirically established by flowing gases such as methane, ethane, propane, butane, and pentane through the monitor. The values of $K_1$ and $K_2$ thus established were $7.538 \times 10^6$ and 1.58, respectively. This calibration procedure must be followed for each monitor which is fabricated, using gases similar to the gas for which the monitor is to be used. However, only two calibration gases are required to define $K_1$ and $K_2$.

The equation for G used in the prototype unit was developed by a standard curve-fitting method using values of G available in the literature for gases such as methane, ethane, etc. As can be appreciated by those skilled in the art, there are other ways to develop and express G and to store it in the computer. The most appropriate method is dependent on the particular application.

The compressibility factor, Z, is a measure of the deviation of the sample gas from ideality and is added to the expression commonly known as the ideal gas law in order to make the ideal gas law applicable to real gases. Since compressibility factors are covered by a vast quantity of literature which includes a number of different methods of computing them, there is no need to explain the basic theory herein. For further information and references to the literature, refer to *Basic Principles and Calculations in Chemical Engineering,* 2nd edition, 1967, Prentice-Hall, Inc., by Himmelblau, p. 149 and following. Also useful are *Chemical Process Principles,* 2nd edition, 1954, John Wiley & Sons, by Hougen et al, p. 87, and *Perry's Chemical Engineers' Handbook,* 4th edition, McGraw-Hill, p. 4–49.

In the prototype device, Z is calculated by means of the equation $$Z = \frac{Z_B}{S^2},$$

where $$S = \left(1 + \frac{3.444 \times 10^5 P_1 10^{0.062 M}}{T_1^{3.825}}\right)^{\frac{1}{2}} \text{ for}$$

$M$ between 16 and 21.75, or $$S = \left(1 + \frac{9.16 \times 10^5 P_1 10^{0.041 M}}{T_1^{3.825}}\right)^{\frac{1}{2}} \text{ for}$$

$M$ between 21.76 and 27.55, and $$Z_B = 0.999287 + 9.25222 \times 10^{-5} M \times 1.06605 \times 10^{-5} M^2,$$

where $Z_B = Z$ at particular base conditions, $S$ = supercompressibility factor, $P_1$ = psig, and $T_1$ = °R.

The equations for S are empirically derived. These and the equation for Z can be found in *Principles and Practices of Flow Meter Engineering,* 9th edition, 1967, by Spink, published by Foxboro Co. and Plimpton Press of Norwood, Mass. The expression for $Z_B$ was derived by means of correlating values of $Z_B$ for gases of different molecular weights. This was done by converting values of base temperatures and pressures for various gases, using critical temperatures and pressures obtained from the literature, to reduced pressure and temperature and then using charts prepared by Nelson and Obert to obtain $Z_B$.

In a relatively simple embodiment of the invention, the sample loop shown in FIG. 2 is omitted. Sample is collected in an evacuated pressure-resistant container, which is then connected to sample line 55, either upstream or downstream of filter 57. The density communicated by the apparatus is that at the temperature and the pressure measured by pressure transmitter 61 and temperature transmitter 67. There is no need to divide the electronics into two packages at two different locations. This embodiment might be used in a laboratory. It might be desired to add to this embodiment the feature that the apparatus is capable of calculating a density value for sample gas at pressures and temperatures different from those measured by transmitters 61 and 67 and which are provided to the apparatus as follows. A temperature and a pressure can be manually entered into the apparatus by means such as input switches 18 or they can be provided by apparatus which measures temperature and pressure at some point of interest and transmits appropriate signals to the computing means of the invention.

FIG. 2 shows a more complex embodiment of the invention where a continuous flow of sample through the oscillator (at temperature T) is established in order to obtain a continuous density value for gas flowing in a process pipeline (at temperature $T_1$ and pressure $P_1$). In this embodiment, the apparatus is arranged to provide a density representative of the sample gas at a point upstream of the pressure controlling means represented by item 58 of FIG. 2 and further arranged so that the upstream point is representative of the main stream from which the sample is taken.

As noted earlier, a variation in the pressure at which gas passes through the oscillator may affect the accuracy of the monitor. This is true even though the pressure is a variable used in calculating density; that is, a calculated density value may be incorrect if the pressure value used in the calculation is correct but outside a particular range. Therefore, it is desirable to monitor the pressure and communicate any departure from a previously established range. This can be accomplished by several means, including adding a primary sensor, such as a pressure switch, in the appropriate location, such as line 55 of FIG. 2, or adding the appropriate means in the electronics portion of the apparatus to utilize the pressure signal provided for use in the equation, such as the signal transmitted by pressure transmitter 61 of FIG. 2. This monitoring provision is not depicted in FIG. 2.

The present invention may be embodied in apparatus for determining the mass flow rate of gas in a pipeline. This can be done by combining apparatus such as that shown in FIG. 2 with apparatus for measuring the volumetric flow rate of the gas in the pipeline and multiplying density times volumetric flow rate in apparatus such as the computing means of FIG. 2. If the apparatus for measuring volumetric flow rate comprises a calibrated obstruction to flow, such as an orifice plate, and means to measure the pressure drop across the obstruction, such as a differential pressure cell, the pressure drop can be provided to the computing means for calculation of mass flow rate instead of calculating the volumetric rate outside the computing means.

The term "gas" is frequently used herein; it should be understood to include vapors. The use of the examples set forth herein are not intended as a limitation on the broad scope of the invention as set forth in the claims. It is also intended that further applications of the principles of the invention as would normally occur to one skilled in the art to which the invention relates be included within the claims.

We claim as our invention:

1. An apparatus for determining the density of a gas comprising:

(a) a fluidic oscillator;

(b) means for establishing flow of a sample of the gas through said oscillator;

(c) means for controlling the pressure at which the sample passes through said oscillator;

(d) means for measuring the temperature of the sample at said oscillator and transmitting a signal representative of the temperature, said temperature being designated as T;

(e) means for measuring the frequency of oscillation at said oscillator and transmitting a signal representative of the frequency, said frequency being designated as F;

(f) means for determining the temperature of said gas at the point at which said density is determined and transmitting a signal representative of the temperature, said temperature being designated as $T_1$;

(g) means for measuring the pressure of said gas at said point of density determination and transmitting a signal representative of said pressure, said pressure being designated as $P_1$;

(h) computing means for calculating the density of said gas by the relationship of $P_1$, T, $T_1$ and F in accordance with the equation $$D = \frac{K_1GTP_1 + K_2P_{11}F^2}{F^2ZRT_1}$$

wherein,

D=density of said gas $K_1$=a constant

G=specific heat ratio of said gas flowing through said oscillator

T=temperature of said gas flowing through said oscillator $P_1$=pressure of said gas at said point of density determination F=frequency of oscillator output signal Z=compressibility factor R=universal gas constant $T_1$=temperature of said gas at said point of density determination; and (i) means for communicating information contained in said computing means.

2. The apparatus of claim 1 further comprising means for establishing a continuous flow of sample through said oscillator.

3. The apparatus of claim 1 further comprising a flow loop which is comprised of an inlet connection and an outlet connection communicating by means for a first conduit wherein the inlet and outlet connections are connected to a process pipeline so that process fluid flows continuously through said flow loop.

4. The apparatus of claim 1 further comprising means for monitoring the pressure of the sample flowing through said oscillator and communicating any departure from a previously established pressure range.

5. The apparatus of claim 1 further comprising means for establishing a flow of one or more calibration gases, in sequence, through said oscillator and means for adjusting said apparatus responsive to the known densities of said calibration gases.

6. A method for determining the density of a gas comprising:

(a) passing a sample of said gas through a fluidic oscillator at a controlled pressure;

(b) measuring the temperature of the sample at said oscillator and transmitting a signal representative of the temperature, said temperature being designated as T;

(c) measuring the frequency of oscillation at said oscillator and transmitting a signal representative of the frequency, said frequency being designated as F;

(d) determining the temperature of said gas at the point at which said density is determined and transmitting a signal representative of the temperature, said temperature being designated as $T_1$;

(e) measuring the pressure of said gas at said point of density determination and transmitting a signal representative of said pressure, said pressure being designated as $P_1$;

(f) calculating the density of said gas by the relationship of $P_1$, T, $T_1$ and F in accordance with the equation $$D = \frac{K_1\,G\,T\,P_1 + K_2\,P_1\,F^2}{F^2\,Z\,RT_1}$$

wherein,

D=density of said gas $K_1$=a constant

G=specific heat ratio of said gas flowing through said oscillator

T=temperature of said gas flowing through said oscillator $P_1$=pressure of said gas at said point of density determination F=frequency of oscillator output signal Z=compressibility factor R=universal gas constant $T_1$=temperature of said gas at said point of density determination; and (g) communicating information contained in said computing means.

7. The method of claim 6 further characterized in that numerical value of said constants $K_1$ and $K_2$ are determined by initial calibration with at least two initial calibration gases having predetermined molecular weights.

8. The method of claim 6 further characterized in that said method comprises intermittent calibration with at least one gas of predetermined molecular weight to periodically monitor the accuracy of the density determination of said method.

* * * * *